US010055856B2

(12) United States Patent
Sabater et al.

(10) Patent No.: US 10,055,856 B2
(45) Date of Patent: Aug. 21, 2018

(54) METHOD AND DEVICE FOR PROCESSING LIGHTFIELD DATA

(71) Applicant: THOMSON LICENSING, Issy les Moulineaux (FR)

(72) Inventors: Neus Sabater, Betton (FR); Matthieu Hog, Thorigné Fouillard (FR); Christine Guillemot, Chantepie (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 15/458,170

(22) Filed: Mar. 14, 2017

(65) Prior Publication Data

US 2017/0263012 A1    Sep. 14, 2017

(30) Foreign Application Priority Data

Mar. 14, 2016   (EP) ..................................... 16305273

(51) Int. Cl.
*G06K 9/00* (2006.01)
*G06T 7/557* (2017.01)
*G06T 5/50* (2006.01)
*G06T 7/11* (2017.01)
*G06T 7/162* (2017.01)

(52) U.S. Cl.
CPC ................ *G06T 7/557* (2017.01); *G06T 5/50* (2013.01); *G06T 7/11* (2017.01); *G06T 7/162* (2017.01); *G06T 2207/10052* (2013.01)

(58) Field of Classification Search
None
See application file for complete search history.

(56) References Cited

U.S. PATENT DOCUMENTS

| 9,460,515 B2 | 10/2016 | Tosic et al. |
| 2004/0222989 A1 | 11/2004 | Zhang et al. |
| 2015/0279056 A1 | 10/2015 | Akeley |

FOREIGN PATENT DOCUMENTS

| CN | 104867129 | 8/2015 |
| GB | 2501950 | 11/2013 |
| JP | 2015084223 | 4/2015 |

OTHER PUBLICATIONS

Jarabo et al., "Efficient Propagation of Light Field Edits", Ibero-American Symposium in Computer Graphics, Faro, Portugal, Jun. 1, 2011, pp. 1-7.
Boykov et al., "Fast Approximate Energy Minimization via Graph Cuts", IEEE Transactions on Pattern Analysis and Machine Intelligence, Intelligence, vol. 23, No. 11, Nov. 2001, pp. 1222-1239.

(Continued)

*Primary Examiner* — Soo Park
(74) *Attorney, Agent, or Firm* — Brian J. Dorini; Patricia A. Verlangieri

(57) ABSTRACT

Method and device adapted for the processing of lightfield data representative of a scene, said lightfield data comprising a plurality of elements, 4-dimensional coordinates being associated with each element. Following operations are performed: associating a ray with each element, the ray being obtained from the 4-dimensional coordinates associated with each element; determining a depth information for each element; determining an origin of each ray in the scene according to the depth information; grouping rays having a same origin in the scene to form a plurality of groups; processing the lightfield data according to the plurality of groups.

12 Claims, 6 Drawing Sheets

(56) References Cited

OTHER PUBLICATIONS

Berent et al., "Adaptive Layer Extraction for image Based Rendering", IEEE International Workshop on Multimedia Signal Processing, Rio de Janeiro, Argentina, Oct. 5, 2009, pp. 1-6.
Jeon et al., "Accurate Depth Map Estimation from a Lenslet Light Field Camera", International Conference on Computer Vision and Pattern Recognition, Boston, Massachusetts, USA, Jun. 3, 2015, pp. 1547-1555.
Li et al., "Image Demosaicing: A systematic Survey", Visual Communications and Image Processing, Proceedings of SPIE, vol. 6822, Jan. 28, 2003, pp. 1-15.
Goldluecke et al., "The Variational Structure of Disparity and Regularization of 4D Light Fields", international Conference on Computer Vision and Pattern Recognition, Portland, Oregon, USA, Jun. 25, 2013, pp. 1003-1010.
Drazic et al., "A Precise Real-time Stereo Algorithm", ACM 27th Conference on image and Vision Computing, Dunedin, New Zealand, Nov. 26, 2012, pp. 1-6.
Wanner et al., "Variational Light Field Analysis for Disparity Estimation and Super-Resolution", IEEE Ttransactions on Pattern Analysis and Machine Intelligence, vol. 36, No. 3, Mar. 2014, pp. 606-619.
Johannsen et al., "On Linear Structure from Motion for Light Field Cameras", 2015 IEEE International Conference in Computer Vision (ICCV), Santiago, Chile, Dec. 13, 2015, pp. 720-728.
Djelouah et al., "Multi-View Object Segmentation in Space and Time", 2013 IEEE International Conference on Computer Vision, Sydney, Australia, Dec. 1, 2013, pp. 2640-2647.
Wanner et al., "Globally Consistent Multi-Label Assignment on the Ray Space of 4D Lght Fields", IEEE Conference on Computer Vision and Pattern Recognition, Portland, Oregon, USA, Jun. 23, 2013, pp. 1011-1018.

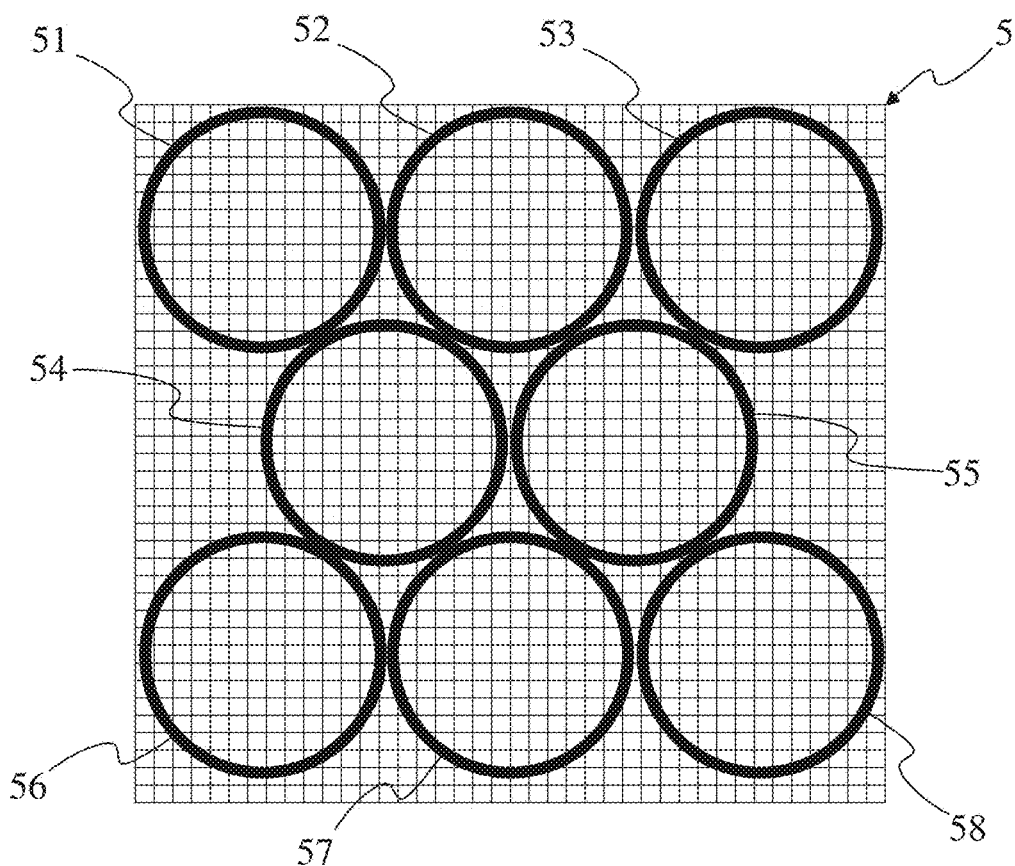

METHOD AND DEVICE FOR PROCESSING LIGHTFIELD DATA

1. REFERENCE TO RELATED EUROPEAN APPLICATION

This application claims priority from European Patent Application No. 16305273.1, entitled "METHOD AND DEVICE FOR PROCESSING LIGHTFIELD DATA", filed on Mar. 14, 2016, the contents of which are hereby incorporated by reference in its entirety.

2. TECHNICAL FIELD

The present disclosure generally relates to light-field imaging, and more particularly to techniques for editing and processing light-field data.

3. BACKGROUND ART

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventional image capturing devices render a three-dimensional scene onto a two-dimensional sensor. During operation, a conventional capturing device captures a two-dimensional (2-D) image reflects the amount of light that reaches a photosensor (or photodetector) within the device. However, this 2-D image contains no information about the directional distribution of the light rays that reach the photosensor (which may be referred to as the lightfield). Depth, for example, is lost during the acquisition. Thus, a conventional capturing device does not store most of the information about the light distribution from the scene.

Light-field capturing devices (also referred to as "light-field data acquisition devices") have been designed to measure a four-dimensional (4D) light-field of a scene by capturing the light from different viewpoints or angles of that scene. Thus, by measuring the amount of light traveling along each beam of light that intersects the photosensor, these devices can capture additional optical information (information about the directional distribution of the bundle of light rays) for providing new imaging applications by post-processing. The information acquired/obtained by a lightfield capturing device is referred to as the light-field data. Lightfield capturing devices are defined herein as any devices that are capable of capturing lightfield data. There are several types of lightfield capturing devices, among which plenoptic devices, which use a microlens array placed between the image sensor and the main lens, and camera array, where all cameras image onto a single shared image sensor.

Lightfield data processing comprises notably, but is not limited to, segmenting images of the scene, generating refocused images of a scene, generating perspective views of a scene, generating depth maps of a scene, generating extended depth of field (EDOF) images, generating stereoscopic images, generating a focal stack, (which comprises a collection of images, each of them being focused at a different focalization distance), and/or any combination of these.

Processing the lightfield data is a challenging task due to the large amount of data that is acquired with the lightfield data acquisition devices.

4. SUMMARY

The present disclosure relates to a method of processing lightfield data representative of a scene, the lightfield data comprising a plurality of elements, 4-dimensional coordinates being associated with each element of the plurality of elements, the method comprising:
- associating a ray with each element, the ray being obtained from the 4-dimensional coordinates associated with each element;
- determining a depth information for each element;
- determining an origin of each ray in the scene according to the depth information;
- grouping rays having a same origin in the scene to form a plurality of groups;
- processing the lightfield data according to plurality of groups.

According to a characteristic, a first ray represented with 4-dimensional coordinates $(s_i, t_i, x_i, y_i)$ and a second ray represented with 4-dimensional coordinates $(s_j, t_j, x_j, y_j)$ are grouped in a same first group of the plurality of groups when:

$$x_i + (s_j - s_i) \times D(s_i, t_i, x_i, y_i) - x_j < E1, \text{ and}$$

$$y_i + (t_j - t_i) \times D(s_i, t_i, x_i, y_i) - y_j < E2$$

wherein $D(s_i, t_i, x_i, y_i)$ corresponds to the depth information associated with the first ray, E1 corresponds to a first determined value and E2 corresponds to a second determined value.

According to a particular characteristic, the first ray and the second ray are grouped in the same first group when:

$$x_j + (s_i - s_j) \times D(s_j, t_j, x_j, y_j) - x_i < E1, \text{ and}$$

$$y_j + (t_j - t_i) \times D(s_j, t_j, x_j, y_j) - y_i < E2$$

wherein $D(s_j, t_j, x_j, y_j)$ corresponds to the depth information associated with the second ray.

According to a specific characteristic, at least one ray is not assigned to a group of said plurality of groups.

According to another characteristic, for at least one pair of groups of the plurality of groups, the method further comprises establishing a relationship between a second group of rays and a third group of rays forming the at least one pair, a weight being associated with the relationship, the weight being determined by:
- for each fourth ray of the second group, calculating a difference between the third ray and said fourth ray when a third ray of the third group is comprised in a neighborhood of the fourth ray;
- determining the weight by summing the differences.

According to another characteristic, the processing comprising segmenting the lightfield data according to the relationship.

The present disclosure relates to an apparatus configured and/or adapted to perform the method of processing the lightfield data.

The present disclosure also relates to a computer program product comprising instructions of program code for executing steps of the method of processing the lightfield data, when the program is executed on a computing device.

The present disclosure also relates to a processor readable medium having stored therein instructions for causing a processor to perform at least a step of the method of processing the lightfield data.

The present disclosure also related to a communication terminal comprising a lightfield camera and/or a processing unit configured to implement the method of processing the lightfield data.

5. LIST OF FIGURES

The present disclosure will be better understood, and other specific features and advantages will emerge upon reading the following description, the description making reference to the annexed drawings wherein:

FIG. 4 illustrates lightfield data captures by an exemplary lightfield camera such as the one provided in conjunction with the embodiments depicted in conjunction with FIGS. 1 or 2A and 2B;

FIG. 5 is an illustration of lightfield data obtained with an exemplary lightfield camera as depicted in conjunction with the embodiment of FIG. 1;

6. DETAILED DESCRIPTION OF THE EMBODIMENTS

Figure 1:
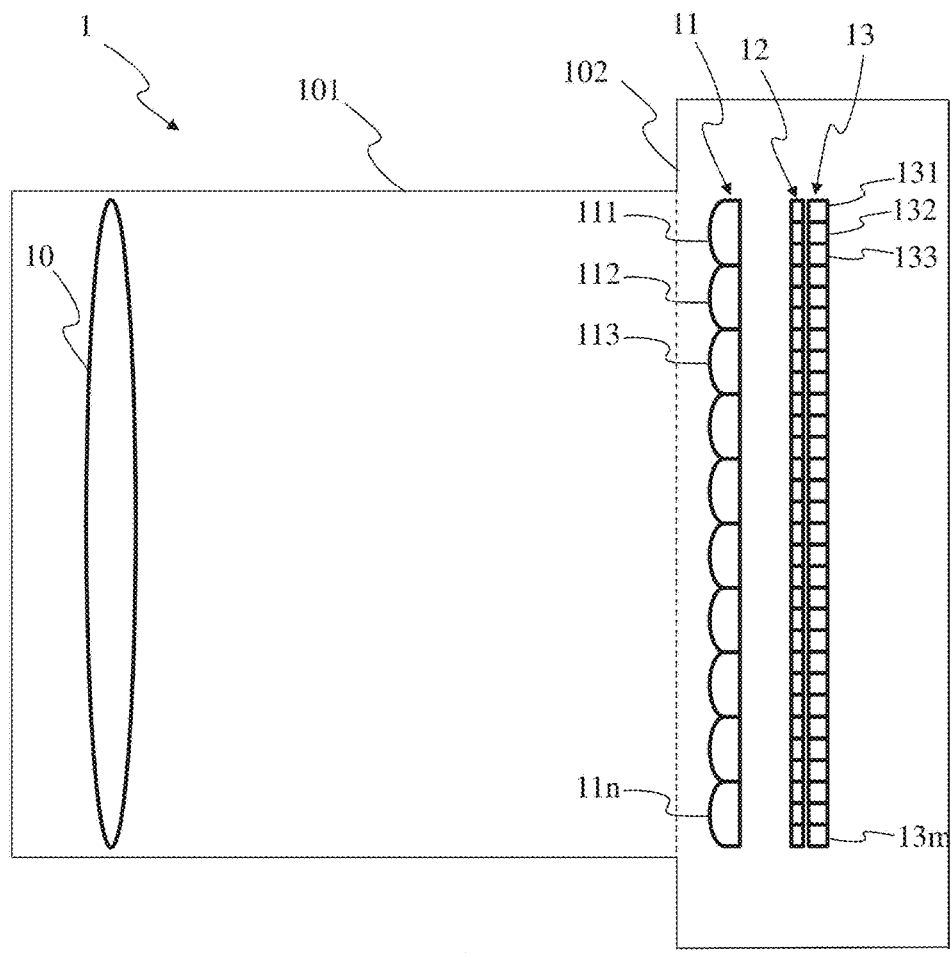
FIG. 1 is a block diagram illustration of a lightfield camera, according to one embodiment of the present principles.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

FIG. 1 is a block diagram depiction of an exemplary lightfield acquisition device according to one embodiment. FIG. 1 illustrates a plenoptic camera 1, having a lens unit 101 (corresponding to an optical assembly) and a camera body 102.

The lens unit 101 is advantageously adapted to be associated with the camera body 102. The camera body 102 comprises a photosensor array 13, which includes a plurality of m photosensors 131, 132, 133 to 13m. Each photosensor corresponds to a pixel of the raw image of the scene acquired with the photosensor array, with each pixel encompassing a part (also called a point) of the scene. Data representative of the scene obtained with each photosensor form a set of lightfield data, the lightfield data ultimately forming a lightfield image. Before processing of the raw image (before demultiplexing and/or demosaicing), the lightfield image may also correspond to the raw image as per one embodiment. In this embodiment, after demultiplexing of the raw image, the lightfield image may then be provided such that it corresponds to sub-aperture images. After demosaicing, the lightfield image will correspond to a set of views of the scene accordingly. For purposes of illustration, the photosensor array 13 as shown only provides a relatively small number of photosensors 131 to 13m However, in alternate embodiments the number of photosensors of FIG. 1 can be varied and either increased or decreased For example, in an alternate embodiment, several thousand or several millions of photosensors can be utilized. In another example, in a 12.4 megapixel camera, a pixel can be provided such that it will correspond to each photosensor (e.g. corresponding to an array of 4088×3040 pixels/photosensors). In one embodiment, a color filter array (CFA) 12 can be used in conjunction with the photosensor array 13. The CFA 12 typically provides for RGB (Red, Green and Blue) color filters on the photosensor array, the RGB arrangement taking for the example the form of a Bayer filter mosaic. According to an alternate embodiment, a CFA is arranged on the lenslet array 11 (in addition to the CFA 12 or in replacement of the CFA 12). For associating the lens unit 101 with the camera body 102, the lens unit 101 comprises a first attaching part and the camera body 102 comprises a second attaching part, the first and second attaching parts being compatible with each other. Thanks to the first and second attaching parts, the lens unit 101 may be clipped onto the camera body 102 or the lens unit 101 may be screwed with the camera body 102. The first and second attaching parts are configured in such a way that, once the lens unit 101 and the camera body 102 have been put together, the lens unit 101 and the camera body 102 form a plenoptic camera configured for acquiring multiple views of a scene at each acquisition of the scene. To this end, the camera body 102 also comprises a lenslet array 11 comprising n microlenses 111, 112, 113, 11n, n being an integer greater than or equal to 2. The lenslet array 11 is also called microlens array. For purposes of illustration, the lenslet array 11 is shown with a relative small number of microlenses, but the number of microlenses may extend up to several thousand or even one or several million of microlenses. A group of photosensors of the photosensor array 13 are optically associated with each microlens 111 to 11n of the lenslet array 11. For example, each microlens 111 to 11n of the lenslet array 11 is sized to correspond to an array of 2×1, 4×4 or 10×10 photosensors. A group of photosensors associated with a microlens (or said differently, a group of photosensors under the microlens) form a micro-image associated with this microlens, each photosensor of the group of photosensors forming a pixel of the micro-image. Each photosensor of the plurality of photosensors optically associated with one single microlens enables to acquire raw data representative of a pixel of the scene according to one position (acquisition of as many parallaxes as pixels). According to a different embodiment, the lens unit 101 and the camera body 102 collectively form one single body and are assembled without being detachable.

The lens unit 101 comprises a camera lens 10, also called a main lens or primary lens, which is advantageously formed of one or more lens elements, only one lens element 10 being depicted in FIG. 1 for clarity purpose.

The plenoptic camera 1 is equally of the type 1.0, corresponding to a plenoptic camera wherein the distance between the lenslet array 11 and the photosensor array 13 is equal to the microlenses focal length, or of the type 2.0 otherwise (also called focused plenoptic camera).

Figure 2A:
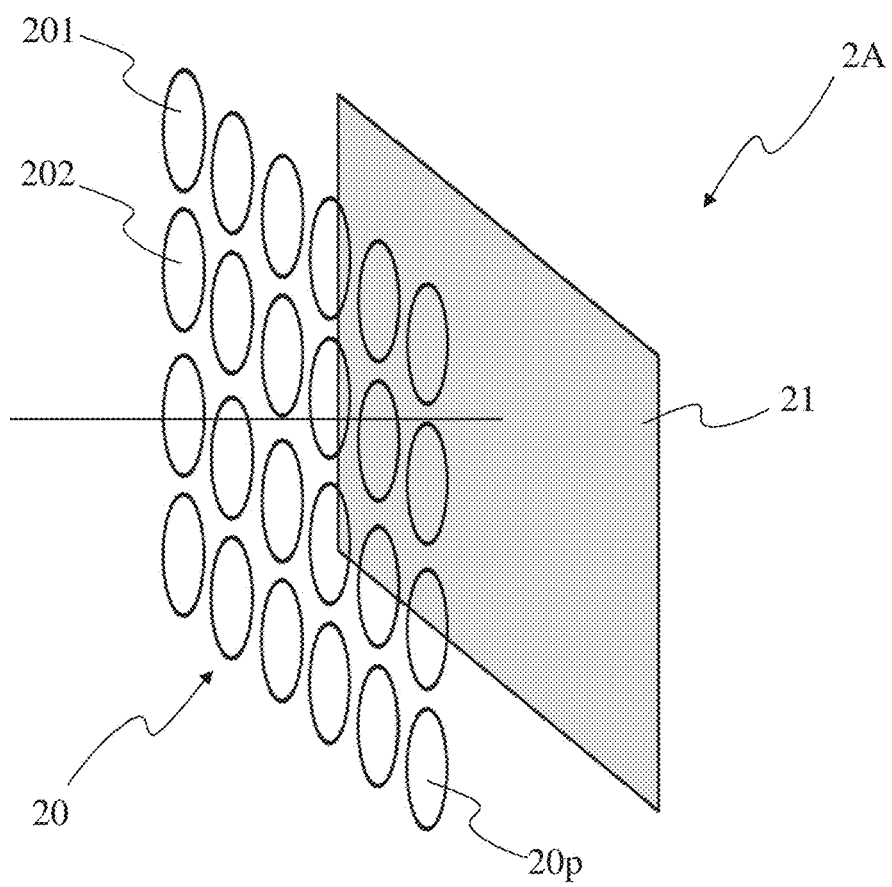
FIGS. 2A and 2B are illustrations of a lightfield camera, according to an embodiment of the present principles.
Figure 2B:
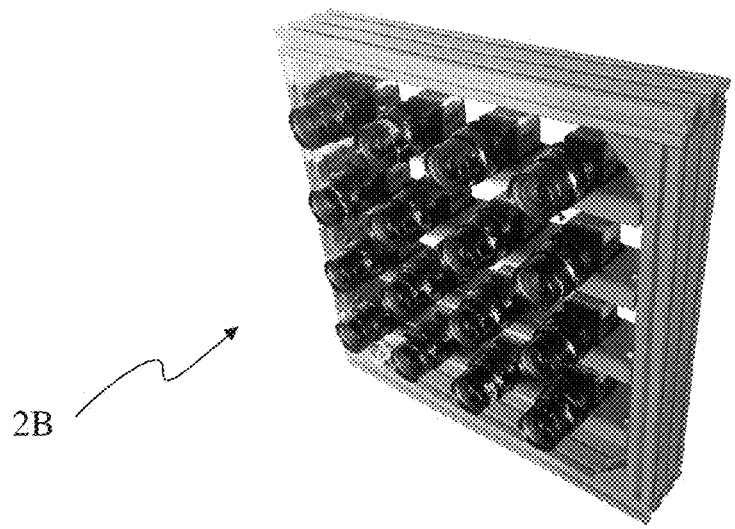

FIGS. 2A and 2B provides other examples of a lightfield acquisition device. More specifically, FIGS. 2A and 2B each show a camera array 2A, 2B (also called multi-cameras array), according to two particular embodiments of the present principles.

The camera array 2A comprises an array of lenses or micro-lenses, referenced 20, comprising several micro-lenses referenced 201, 202 to 20p with p being an integer corresponding to the number of micro-lenses, and one or several sensor arrays, referenced 21. The camera array 2A is without main lens. The array of lenses 20 may be a small device, which is commonly named a micro-lens array. It is worth noting that the camera array with a single sensor can be considered as a special case of plenoptic camera where the main lens has an infinite focal. According to a particular arrangement wherein the number of photosensors is equal to the number of micro-lenses, i.e. one photosensor is optically associated with one micro-lens, the camera array 20 may be seen as an arrangement of several individual cameras (for example micro-cameras) closely spaced from each other, such as a square arrangement (as illustrated in FIG. 2A) or a quincunx arrangement for example.

The camera array 2B corresponds to a rig of individual cameras each comprising a lens and a photosensor array. The cameras are spaced from each other, for example of a distance equal to a few centimeters or less, for example 5, 7 or 10 cm.

The lightfield data (forming a so-called lightfield image) obtained with such a camera array 2A or 2B corresponds to the plurality of views of the scene, i.e. to the final views obtained by demultiplexing and demosaicing of the raw image obtained with a plenoptic camera such as the plenoptic camera of FIG. 1. The cameras of the camera array are calibrated according to any known method, i.e. intrinsic and extrinsic parameters of the cameras are known.

Figure 3:
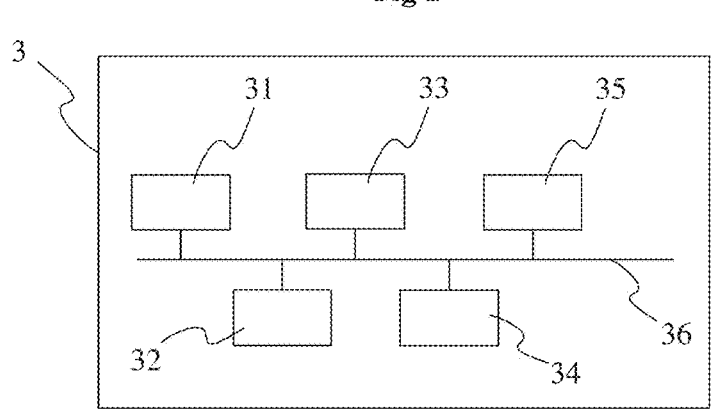
FIG. 3 is an illustration of an embodiment depicting a processing unit configured to process data provided by the lightfield camera of as per embodiments of FIG. 1 or FIGS. 2A and 2B and FIG. 8

FIG. 3 shows a schematic block diagram illustrating an example of an apparatus 3 for processing lightfield data. The lightfield data are for example received from the lightfield acquisition device of FIG. 1 or 2A, 2B. According to another example, the lightfield data are received from a storage device onto which the lightfield data are stored.

The apparatus 3 comprises a processor 31, a storage unit 32, an input device 33, a display device 34, and an interface unit 35 which are connected by a bus 36. Of course, constituent elements of the computer apparatus 3 may be connected by a connection other than a bus connection using the bus 36.

The processor 31 controls operations of the apparatus 3. The storage unit 32 stores at least one program to be executed by the processor 31, and various data, including data of 4D the light field images (lightfield data) captured and provided by a light field camera, parameters used by computations performed by the processor 31, intermediate data of computations performed by the processor 31, and so on. The processor 31 may be formed by any known and suitable hardware, or software, or a combination of hardware and software. For example, the processor 31 may be formed by dedicated hardware such as a processing circuit, or by a programmable processing unit such as a CPU (Central Processing Unit) and/or GPUs (Graphical Processing Unit) that executes a program stored in a memory thereof.

The storage unit 32 may be formed by any suitable storage or means capable of storing the program, data, or the like in a computer-readable manner. Examples of the storage unit 32 include non-transitory computer-readable storage media such as semiconductor memory devices, and magnetic, optical, or magneto-optical recording media loaded into a read and write unit. The program causes the processor 31 to perform a process for processing (e.g. editing or segmenting) the lightfield data, according to an embodiment of the present disclosure as described hereinafter with reference to FIG. 9.

The input device 33 may be formed by a keyboard, a pointing device such as a mouse, or the like for use by the user to input commands, to make user's selections of objects of interest within the scene. The output device 34 may be formed by a display device to display, for example, a Graphical User Interface (GUI), images of the focal stack, or a depth map image. The input device 33 and the output device 34 may be formed integrally by a touchscreen panel, for example.

The interface unit 35 provides an interface between the apparatus 3 and an external apparatus. The interface unit 35 may be communicable with the external apparatus via cable or wireless communication. In this embodiment, the external apparatus may be a lightfield acquisition device, e.g. a lightfield camera. In this case, data of 4D lightfield images captured by the lightfield acquisition device can be input from the lightfield acquisition device to the apparatus 3 through the interface unit 35, then stored in the storage unit 32.

In this embodiment the apparatus 3 is exemplarily discussed as it is separated from the lightfield acquisition device, which in one embodiment can communicate with each other via cable or wireless communication. In one embodiment, the apparatus 3 may be integrated with a lightfield acquisition device.

Although only one processor 31 is shown on FIG. 3, it must be understood that such a processor may comprise different modules and units embodying the functions carried out by apparatus 3 according to embodiments of the present disclosure, such as:
- a module for segmenting the lightfield data, i.e. for grouping elements of the lightfield data according to the object of the scene they are representative of;
- a module for identifying objects of interest in the scene;
- a module for assessing the depth of objects of interest;
- a module for determining the number of focused images to be associated to each object of interest;
- a depth computation module for calculating depths from the lightfield data set or from a matrix of views generated from the lightfield data set;
- a computing unit for computing the position of objects of interest in the scene from the calculated depths.

In alternate embodiment, the modules and units can be embodied in several processors 31 accordingly that communicate and co-operate with each other.

FIG. 4 shows a first example of lightfield data 4 obtained with the lightfield camera 1 or 2, according to one embodiment of the present principles. In the example of FIG. 4, the lightfield data is represented with a collection of views 400 to 403, 410 to 413, 420 to 423 and 430 to 433 that are represented with a matrix 4 of 4 rows and 4 columns, as shown. The two last digit of each reference number for each view indicates the corresponding row and column associated with the view. For example, the view referenced 400 belongs to the first row having as indicia 0 and to the first column having as indicia 0 and the view referenced 421 belongs to the third row having as indicia 2 and to the second column having as indicia 1, the rows being indexed from 0 to 3 and the columns being indexed from 0 to 3.

Each view 400 to 403, 410 to 413, 420 to 423 and 430 to 433 is an image of the scene according to a particular point of view, each view being associated with a different point of view. Each view comprises a plurality of pixels, for example N rows×M columns of pixels (also called elements), each pixel/element having color information associated with, for example RGB color information or CMY (Cyan, Magenta, and Yellow) color information.

The views are, for example, obtained directly from the lightfield camera 2, one view being acquired directly through one lens of the array of lenses 20 or by processing the raw image acquired with the lightfield camera 1, i.e. by demultiplexing (as described in the article entitled "*Accurate Depth Map Estimation from a Lenslet Light Field Camera*" by Hae-Gon Jeon Jaesik Park Gyeongmin Choe Jinsun Park, Yunsu Bok Yu-Wing Tai In So Kweon) and demosaicing (as described in "*Image demosaicing: a systematic survey*" by Li, Gunturk and Zhang, *Proc. SPIE, vol.* 6822, p. 68221) (2008)) the raw image. The demosaicing enables to recover a full color raw image, i.e. to recover full color information (for example RGB information) for the pixels of the raw image while the raw image acquired with the plenoptic image associates only one color component (R, G or B for example) with each pixel. The demultiplexing consists in reorganizing the pixels of the raw image in such a way that all pixels capturing the light rays with a certain angle of incidence are stored in the same image creating the so-called sub-aperture images. Each sub-aperture image is a projection of the scene under a different angle. The set of sub-aperture images creates a block matrix where the central image stores the pixels capturing the light rays perpendicular to the photosensor array.

The number of views are not limited to 16 but in alternate embodiments can extend to any integer accordingly such as 4 views, 10 views, 100 views or n views. The arrangement of the views is not limited to a rectangular matrix arrangement either and can be of any geometrical shape such as a circular matrix arrangement, a quincunx matrix arrangement or others.

The lightfield data comprises a plurality of elements (or pixels), with each element being represented with a 4-dimensional coordinate, (i.e. two coordinates to identify the view the element belongs to and two other coordinates provided to identify the location of the element within the view it represents). For example, an element 'i' of the lightfield data is represented by the 4 coordinates $(s_i, t_i, x_i, y_i)$. $s_i$ and $t_i$ correspond to the indices of the view the element 'i' belongs to (e.g. $s_i$ corresponds to the row indicia of the view and $t_i$ to the column indicia of the view in the matrix of views). $x_i$ and $y_i$ correspond for example to the row indicia and column indicia of the element 'i' within the view $(s_i, t_i)$, $0 \le x \le N-1$ and $0 \le y \le M-1$.

A ray of light $r_i$ may be associated with the element the ray $r_i$ being represented with the 4-dimensional coordinates $(s_i, t_i, x_i, y_i)$ of the element 'i'. The lightfield data is represented with a set of rays (one ray for one element of the lightfield data) using the two planes parametrization, the coordinates (s, t) for the first plane and the coordinates (x, y) for the second plane. The first and second planes are equipped with a 2D coordinate systems which are compatible in the sense that the base vectors are parallel and the origins lie on a line orthogonal to both first and second planes.

FIG. 5 shows a second example of lightfield data 5 obtained for use with the lightfield camera 1, according to one embodiment. In the example of FIG. 5, the lightfield data 5 is a matrix of pixels (also called lightfield data elements) that may correspond to the raw image acquired with a plenoptic camera such as the one illustrated on FIG. 1. Microlenses of the microlens array are each associated with a set of elements, forming a set of micro-images 51 to 58. Each micro-image comprises a plurality of elements having color information associated with, for example Red, Green or Blue color information.

Naturally, the number of microlenses (or equivalently of micro-images) is not limited to 8 but extends to any integer number, for example 4, 10, 100 microlenses or more. The arrangement of the microlenses is not limited to a quincunx matrix arrangement but extends to any arrangement, for example a rectangular matrix arrangement.

The lightfield data comprises a plurality of elements (or pixels), each element being represented with 4-dimensional coordinates, i.e. two coordinates to identify the microlens (or the micro-image) the element is associated with (respectively belongs to) and two other coordinates to identify the location of the element within the micro-image it belongs to. For example, an element 'i' of the lightfield data is represented by the 4 coordinates $(s_i, t_i, x_i, y_i)$. $s_i$ and $t_i$ correspond to the indices of the micro-image (i.e. the location of the micro-image within the arrangement of micro-images) the element 'i' belongs to (e.g. $s_i$ corresponds to the row indicia of the micro-image/microlens and $t_i$ to the column indicia of the micro-image/microlens in the matrix of micro-images/microlenses). $x_i$ and $y_i$ correspond for example to the row indicia and column indicia of the element 'i' within the micro-image $(s_i, t_i)$, $x_i$ and $y_i$ being for example expressed with regard to the center of the micro-image.

A ray of light $r_i$ may be associated with the element 'i' the ray $r_i$ being represented with the 4-dimensional coordinates $(s_i, t_i, x_i, y_i)$ of the element 'i'. The lightfield data may be represented with a set of rays (one ray for one element of the lightfield data) using the two planes parametrization, the coordinates (s, t) for the first plane and the coordinates (x, y) for the second plane. The first and second planes are equipped with a 2D coordinate systems which are compatible in the sense that the base vectors are parallel and the origins lie on a line orthogonal to both first and second planes.

Figure 6:
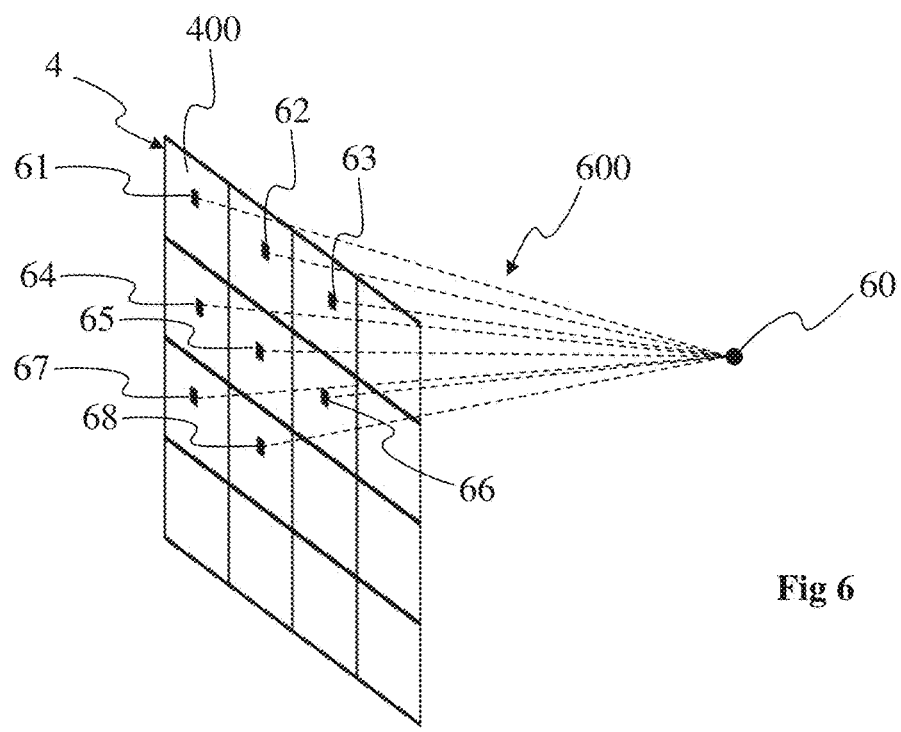
FIG. 6 shows the grouping of rays associated with the lightfield data of FIG. 4, according to one embodiment.

FIG. 6 shows the grouping of rays associated with the lightfield data 4, according to one embodiment. FIG. 6 shows a first group of rays 600 (also called ray bundle), the origin of each ray of the first group 600 being a same 3D point 60 of the scene, each ray being associated with an element of the lightfield data, i.e. elements 61 to 68. The elements 61, 62, 63, 64, 65, 66, 67 and 68 are comprised in the views 400, 401, 402, 410, 411, 412, 420 and 421 respectively. The elements 61 to 68 are called corresponding elements as they all refer to the same point 60 of the scene.

The origin of a ray $r_i$ associated with a given element 'i' of the lightfield data 4 is determined by using the depth information $D(r_i)$, expressed under the form of a depth value (also denoted $D(s_i, t_i, x_i, y_i)$) associated with said given element. The ray is defined with the 4-dimensional coordinates $(s_i, t_i, x_i, y_i)$ associated with the element 'i'. The origin of the ray $r_i$ is obtained by travelling along the ray $r_i$, departing from the element 'i', on the distance corresponding to $D(r_i)$. The origin of the ray $r_i$ corresponds to the point of the scene belonging to the ray $r_i$ and located at a distance $D(r_i)$ from the element 'i' along the ray $r_i$.

A group of rays, for example, are obtained by taking one element 61 having coordinates $x_i, y_i$ in a reference view of coordinates $s_i, t_i$ (for example the view 400 with row index 0 and column index 0). The element 61 is projected into the other views to find the elements in the other views corresponding to the projection of the elements 61. For example, the projection of the element 61 of the view 400 is the element 62 in the view 401, the element 63 in the view 402, the element 64 in the view 410, the element 65 in the view 411, the element 66 in the view 412, the element 67 in the view 420 and the element 68 in the view 421. The projection of the element 61 in the other views is for example obtained by using the depth information associated with the element 61 expressed under the form of a disparity value (expressed for example in a number of pixel(s)). For example, if the element 62 (that corresponds to the projection of the element 61 in the view 401) has the coordinates ($s_j$, $t_j$, $x_j$, $y_j$), an associated ray $r_j$ and an associated depth information $D(r_j)$ (also denoted $D(s_j, t_j, x_j, y_j)$), the rays $r_i$ and $r_j$ are considered belonging to the same group when:

$$x_i + (s_i - s_j) \times D(s_i, t_i, x_i, y_i) + x_j \le E1, \text{ and}$$

$$y_i + (t_i - t_j) \times D(s_i, t_i, x_i, y_i) - y_j \le E2$$

wherein E1 and E2 are determined values (for example threshold values) to consider the imprecision when determining the projection element for example. E1 and E2 may be a same value or different values and may be for example equal to a value close to 0, for example 0.01, 0.02 or 0.5.

According to a variant, it is further checked if:

$$x_j + (s_j - s_i) \times D(s_j, t_j, x_j, y_j) - x_i \le E1, \text{ and}$$

$$y_j + (s_j - t_i) \times D(s_j, t_j, x_j, y_j) - y_i \le E2$$

before assigning the rays $r_i$ and $r_j$ to the same group. This second check enables to check that the element 62 also projects onto the element 61. If not, it means that an occlusion has been detected and it also prevent two incoherent depth values to be wrongly assigned to a same group of rays.

According to an alternate embodiment, in the case where E1=E2=0, the rays $r_i$ and $r_j$ are considered belonging to the same group when:

$$x_i + (s_i - s_j) \times D(s_i, t_i, x_i, y_i) - x_j = 0, \text{ and}$$

$$y_i + (t_i - t_j) \times D(s_i, t_i, x_i, y_i) - y_j = 0$$

and/or $$x_j + (s_j - s_i) \times D(s_j, t_j, x_j, y_j) - x_i = 0, \text{ and}$$

$$y_j + (t_j - t_i) \times D(s_j, t_j, x_j, y_j) - y_i = 0.$$

The same operations are performed for each projecting element of the element 61 to check if all rays associated with the projecting elements of the element 61 belong to the same first group of rays, i.e. correspond to a same point of the scene.

The elements of a reference view (for example the view 400) are considered one after another and the operations described hereinabove are performed for each element to generate different groups of rays. Once each and every element of the reference view have been processed, the remaining elements (i.e. elements for which the associated ray has not been assigned to a group of rays) of the other views may be processed one after another to test all the elements of the lightfield data.

In another embodiment, alternatively the projections of the element 61 in the other views is obtained by determining the projection of the element 61 in the scene (using intrinsic and extrinsic parameters of the camera used to acquire the view 400 and the depth value associated with the element 61), the point of the scene corresponding to the projection of the element 61 being then re-projected into each one of the other views (by using the intrinsic and extrinsic parameters of the cameras used to acquire the other views). To check for potential occlusion, it is also checked whether the elements corresponding to the projection of the element 61 project onto the element 61 by using the intrinsic and extrinsic parameters of the cameras and the depth information associated with the projection elements.

According to yet another embodiment the origins of the arrays associated with the elements of the lightfield data are classified according to their 3-dimensional coordinates in the space of the scene. A determined number of clusters of 3D points is obtained, each cluster corresponding to a group of rays.

Rays that are not assigned to any group are called free rays as they each correspond to a point of the scene that is the origin of a single ray (or that is associated with a single element of the lightfield data).

Figure 7:
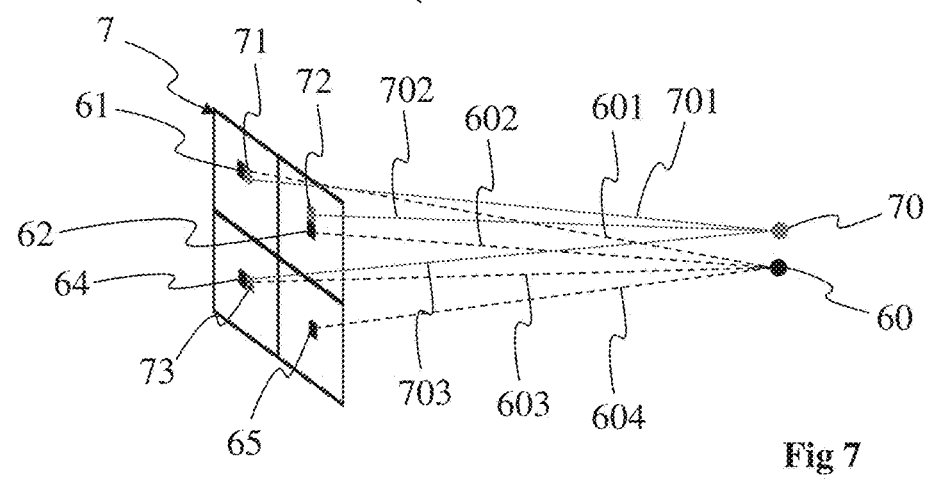
FIGS. 7 and 8 are illustrations depicting the existence of a relationship as provided between two groups of rays associated with a part of the lightfield data such as provided in the exemplary embodiment of FIG. 4.
Figure 8:
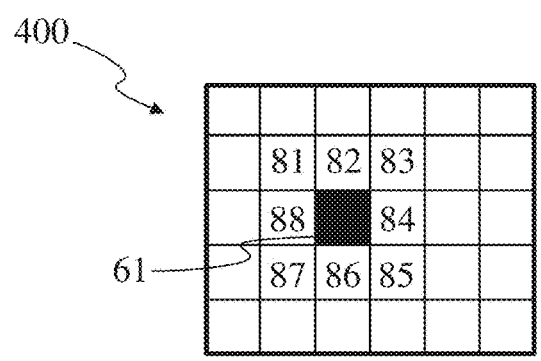

FIGS. 7 and 8 show the relationship between two groups of rays, according to one embodiment. FIG. 7 shows specifically a part 7 of the lightfield data 4, for example the 4 upper left views 400, 401, 410 and 411 and associated elements. Elements 61, 62, 64 and 65 and associated rays 601, 602, 603 and 604 respectively are associated with the same 3D point 60 of the scene, rays 601 to 604 being part of the first group 600 described with regard to FIG. 6 and being illustrated with dash lines. Elements 71, 72 and 73, which belongs to the views 400, 401 and 410 respectively, are associated with the rays 701, 702 and 703 respectively and refer the same 3D point 70 of the scene. The rays 701, 702 and 703 form a second group of rays, or part of it, and are illustrated with solid lines.

A relationship between two different groups, in one embodiment, is determined when the groups are neighbours. Two different groups are considered as neighbours when they have at least one element in the neighbourhood of the elements of each other. Considering a ray of the first group, for example the ray 601, it is searched whether it exists an element associated with a ray of the second group that is located in the neighbourhood of the element associated with the element 61 associated with the considered ray 61 of the first group.

FIG. 8 is an embodiment illustrating the neighbourhood of the element 61. In FIG. 8, the view 400 comprising the lightfield element 61 illustrated with a black cell is shown. Elements 81 to 88 are defined to belong to the neighbourhood of element 61, since they correspond to the same view 400 and are adjacent to element 61. In an alternate embodiment, only a part of the elements 81 to 88 are considered to belongs to the neighbourhood of the element 61, in this case particularly elements 82, 84, 86 and 88 (i.e. the elements belonging to the same row or the same column as the element 61 and adjacent to the element 61). According to yet another embodiment, the neighbourhood of the element 61 can comprise the elements 81 to 88 and the elements which are adjacent to elements 81 to 88. Element 71 belongs to the same view 400 as that of element 61 and is associated with the ray 701 of the second group which also belongs to the neighbourhood of that element. The first group of rays and the second group of rays are consequently considered as being neighbours and a relationship is established between them. To that end, for each ray of the first group a relationship is established that associates an element with a ray of the second group that is located in the neighbourhood of the element associated with each ray of the first group. According to the example of FIG. 7, elements 71, 72 and 73 are associated respectively with rays 701, 702 and 703 of the second group, which are in turn in the neighbourhood of elements 61, 62 and 64 respectively and also associated with the rays 601, 602 and 603 of the first group. In the example of FIG. 7, the element 65 associated with the ray 604 of the first group does not have any element associated with a ray of the second group in its neighbourhood. The relationship between the first group of rays and the second group of rays is established by calculating the difference between each ray of the first group and the ray of the second group which is located in the neighbourhood of each ray of the first group, and by summing all their calculated differences.

The difference between neighbouring rays of the first group and the second group is determined according to the color difference information existing between the elements associated with the neighbouring rays. For example, the difference between the rays 601 and 701 corresponds to the difference between the color information of the element 61 and the element 71, the difference between the rays 602 and 702 corresponds to the difference between the color information of the element 62 and the element 72 and the difference between the rays 603 and 703 corresponds to the difference between the color information of the element 64 and the element 73. According to a variant, the difference is determined according to the depth information associated with neighbouring elements of neighbouring rays of the first and second groups. According to a variant, the difference is determined by taking into account the difference in color information and the difference in depth information.

According to one embodiment, a relationship is further established between a determined group of rays and a free ray located in the neighbourhood of the determined group of rays, i.e. when the free ray is in the neighbourhood of one of the ray of the determined group of rays. According to a variant, a relationship is established between any group of rays and any free ray located in the neighbourhood of a group of rays.

Grouping the rays into a plurality of groups and establishing a relationship between the different groups of rays and between the different groups of rays and the free rays enable to obtain a simplified representation of the lightfield (e.g. under the form of a graph) with an amount of data that is less than the amount of data needed when the lightfield data is represented with each element of the lightfield considered individually.

Figure 9:
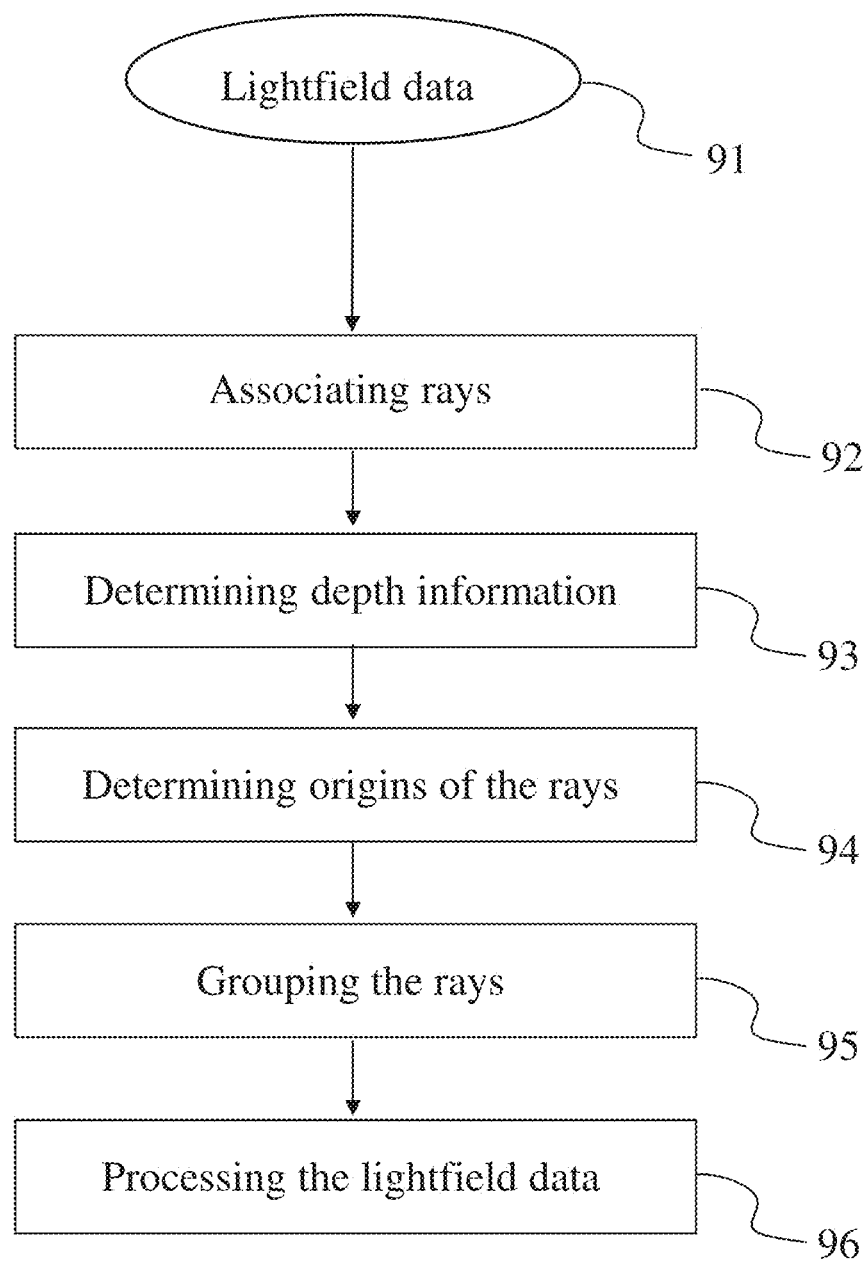
FIG. 9 is a flowchart depiction illustrating processing of lightfield data as per embodiments depicted in FIG. 4 or 5.

FIG. 9 shows a flow chart depiction for processing lightfield data 91 that corresponds for example to the lightfield data 4 or 5, as per one embodiment. In this embodiment, the lightfield data is received from a lightfield acquisition device, from a storage device or from a server located remotely, e.g. via the Internet. The lightfield data comprises a plurality of lightfield elements, for example arranged under the form of a matrix of elements (or pixels).

In a step 92, rays are associated with the elements of the lightfield data 91, the rays being obtained by using the 4-dimensional coordinates of the elements of the lightfield data. The lightfield data may then be represented with a set of rays (one ray for one element of the lightfield data) using the two planes parametrization. The 4-dimensional coordinates associated with a given element of the lightfield correspond for example to the two indices used to identify the view or the microlens the given element belongs to and two coordinates to identify the location of the given element within the view/microlens. According to a variant, the 4-dimensional coordinates comprise two coordinates to locate the given element within the matrix of element (corresponding to the lightfield data) and two angular coordinates.

In a step 93, the depth information associated with the elements of the lightfield data is determined. The depth information corresponds for example to a depth value (expressed for example in meter) or to a disparity value (expressed for example in number of pixels). The depth information is determined for example as described in "*Globally consistent multi-label assignment on the ray space of 4d light fields*", by Wanner, Sven, Christoph Straehle, and Bastian Goldluecke, in Proceedings of the IEEE Conference on Computer Vision and Pattern Recognition, 2013; or in Wanner, Sven, and Bastian Goldluecke. "*Variational light field analysis for disparity estimation and Super-resolution.*", in Pattern Analysis and Machine intelligence, IEEE Transactions on 36.3 (2014): 606-619; or in "*The Variational Structure of Disparity and Regularization of 4D Light Fields*", by Bastian Goldluecke, Sven Wanner, in In Proc. International Conference on Computer Vision and Pattern Recognition, 2013; or in "*A precise real-time stereo algorithm*", by Drazic, Valter, and Neus Sabater, in Proceedings of the 27th Conference on Image and Vision Computing New Zealand, ACM, 2012.

In a step 94, the origin of each ray is determined, the origin corresponding to a 3D point of the scene represented by the lightfield data. Departing from an element of the lightfield data and knowing the depth information associated with this element, the origin of the ray corresponds to the 3D point of the scene located on the ray at a distance corresponding to the depth associated with the element along the ray. In other words, a ray is traced from a given element and the origin is the intersection point between the ray and the scene at a distance corresponding to the depth associated with the given element along the ray associated with the given element. The same operation is performed for each element of a part or of the whole lightfield data 91.

In a step 94, the rays associated with the elements of the lightfield data 91 are grouped, rays having a same origin in the scene belonging to a same group. Given a light field parametrized using the two plane parametrization, let $r_i$ be a light ray represented by its 4-D coordinates $(s_i, t_i, x_i, y_i)$. Its local depth measurement is denoted as $D(r_i)$ representing the pixel shift from one view of coordinates (s,t) to an adjacent view $(s+\delta_s, t+\delta_t)$ with $\delta$ small. A group of rays (also called ray bundle) $b_i$ is defined as the set of all rays describing the same 3D scene point, according to their depth measurement $D(r_i)$. Formally, two rays $r_i$ and $r_j$ belong to the same group if and only if $x_i+(s_i-s_j)\times D(s_i,s_i,x_i,y_i)=x_j$ (and idem for the t−y direction) or $x_i+(s_i-s_j)\times D(s_i,s_i,x_i,y_i)-x_j \leq \varepsilon 1$, where $\varepsilon 1$ corresponds to a determined value close to 0 or equal to 0.

In an alternate embodiment, before assigning two rays to the same group of rays, it is checked as whether the same equality holds backward $x_j+(s_j-s_i)\times D(s_j,y_j,x_j,y_j)=x_i$ (or $x_j+(s_j-s_i)\times D(s_j,y_j,x_j,y_j)-x_i \leq \varepsilon 1$). This checking enables detection of occlusions because an occlusion can be detected when the equality does not hold backward. A ray is called free when at the end of the ray grouping operation it has not been assigned to any group of rays. Each group of ray is for example identified with a unique identifier, each free ray being also identified with a unique identifier.

In a step 95, the lightfield data is processed by using the information relative to the groups of rays and/or the information relative to the free ray (a free ray may be seen as a group comprising one single ray). The processing may for example correspond to the detection of occlusion (corresponding to the free rays).

According to an alternate embodiment, the processing may correspond to a segmenting of the lightfield data. To reach that aim of segmenting, the relationship between the groups of rays and the free rays may be determined. A set R is defined as containing all free rays and a super set B as containing all groups of rays. In this setup, if LF denotes the set of all rays (i.e the light field), regardless if they are free or not, then LF=R∪B. To define the neighboring relationship between free rays and ray bundles, let $N(r_i)$ the 4-connect neighborhood of $r_i$ on each view, that is to say the set of rays $\{r_j, r_k, r_l, r_m\}$ with $r_j$ of coordinates $(s_i, t_i, x_i-1, y_i)$
$r_k$ of coordinates $(s_i, t_i, x_i+1, y_i)$
$r_l$ of coordinates $(s_i, t_i, x_i, y_i-1)$
$r_m$ of coordinates $(s_i, t_i, x_i, y_i+1)$ One free ray $r_i$ is neighbor a ray bundle $b_i$ if and only if one ray element of $b_i$ is neighbour of $r_i$ (i.e. $r_i \in N(b_i) \Leftrightarrow b_i \cap N(r_i) \neq 0$). Similarly, two groups of ray $b_i$ and $b_j$, are neighbours if they have at least one element in the neighborhood of the elements of each other (i.e. $b_j \in N(b_i) \Leftrightarrow \exists r_i \in b_i | r_i \in N(b_j)$). A graph G={V, E} may be built such that each node of the graph corresponds to one element of R and B (abusing of the notation V=B∪R), and the edges are defined by the neighbouring relationship between two rays, two groups, and between rays and groups $(E=(r_i,r_j)|r_j \in N(r_i) \cup (b_i,r_i)|r_i \in N(b_i) \cup (b\_i,b\_j)|b_i \in N(b_j))$. Such an approach enables to reduce significantly the amount of data at the input of RMF (Random Markov Field) algorithms for example. Indeed, using the well-known Graph-Cut Algorithm using maximum flow, typical solving complexity is $O(f|E|)$ or $O(|V||E|^2)$ with f the maximum flow and |V|,|E| the number of nodes and edges. The determining of the free rays avoids issues related to the occlusions and avoids artifacts in the depth map.

One possible use of the representation of the lightfield data with nodes (i.e. groups or rays and free rays) and edges (relationship between the groups of nodes and free rays) is image multilabel segmentation using graph cuts. If L corresponds to the labelling function that assign a label α to each free ray and ray group. The energy that is sought to be minimized is of the form:

$$\varphi_L = \Sigma_{\{r_i \in R\}} U(r_i) + \Sigma_{\{b_i \in B\}} U(b_i) + m.(\Sigma_{\{r_i \in R\}} \Sigma_{\{r_j \in N(r_i)\}} P(r_i, r_j) + \Sigma_{\{b_i \in B\}} \Sigma_{\{r_j \in N(b_i)\}} P(b_i, r_j) + \Sigma_{\{b_i \in B\}} \Sigma_{\{b_j \in N(b_i)\}} P(b_i, b_j))$$

Where U denotes the data terms and P the smoothness terms. As, in conventional, non-iterative graph cut, m is the user-tuned coefficient that enforce more label consistency between neighborhood free rays or groups of rays. The data term for the free rays and color group may be defined using Gaussian Mixture Model (GMM) for instance. Given the light field, a scribble image is obtained by user interaction. The user provides different colors over the object he/she wants to segment. As in conventional graph cut, the scribbles need to cover the different parts of different color of each object.

The color of a ray is denoted $L_f(r_i)$ and the color of a ray group is the average of the rays it comprises:

$$L_f(b_i) = \frac{\Sigma r_i \in b_i L_{f(r_i)}}{|b_i|}.$$

S is called the scribble image of the same size as the view of coordinates (s,t) used for editing. Each element/pixel value under a scribble represent a label code (from 1 to the number of scribbles) and 0 otherwise.

If Π denotes the probability of a ray or bundle to belong to an object a according to the learn GMM and its color, the data term of a ray r_i for a label α is then defined as the negative log likelihood of the ray color forward probability. The input scribbles is used as a hard constraint by setting to 0 and ∞ the unary term of a free ray under a scribble:

$$U(r_i) = \begin{cases} -\log(\Pi(L_f(r_i)|L(r_i) = \alpha) & \text{if } S(r) = 0 \\ \infty & \text{if } S(r) = \alpha \\ 0 & \text{otherwise} \end{cases}$$

Similarly, a group/bundle data term is defined as:

$$U(b_i) = \begin{cases} -\log(\Pi(L_f(b_i)|L(b_i) = \alpha) & \text{if } \exists r_i \in b_i \text{ s.t } S(r_i) = 0 \\ \infty & \text{if } \exists r_i \in b_i \text{ s.t } S(r_i) = \alpha \\ 0 & \text{otherwise} \end{cases}$$

The pairwise probability is defined for pairs of free rays and between a free ray and groups of rays as in a conventional color continuity:

$$P(r_1, r_2) = \exp\left(\frac{-\Delta E(L_f(r_1), L_f(r_2))}{\sigma}\right)$$

$$P(b, r) = \exp\left(\frac{-\Delta E(L_f(b), L_f(r))}{\sigma}\right)$$

Where σ the local color variance, ΔE the CIELab color distance.

For the pairs of ray groups, the pairwise term is defined from the sum of the rays of each bundle that are neighbor to each other:

$$P(b_1, b_2) = |b_2 \cap N(b_1)| \exp\left(\frac{-\Delta E(L_f(b_1), L_f(b_2))}{\sigma}\right)$$

The energy is then minimized efficiently using alpha expansion, as described for example in "*Fast approximate energy minimization via graph cuts*", by Boykov Yuri, Olga Veksler and Ramin Zabih in Pattern Analysis and Machine Intelligence, IEEE Transactions on 23 Nov. 2001: 1222-1239.

Figure 10:
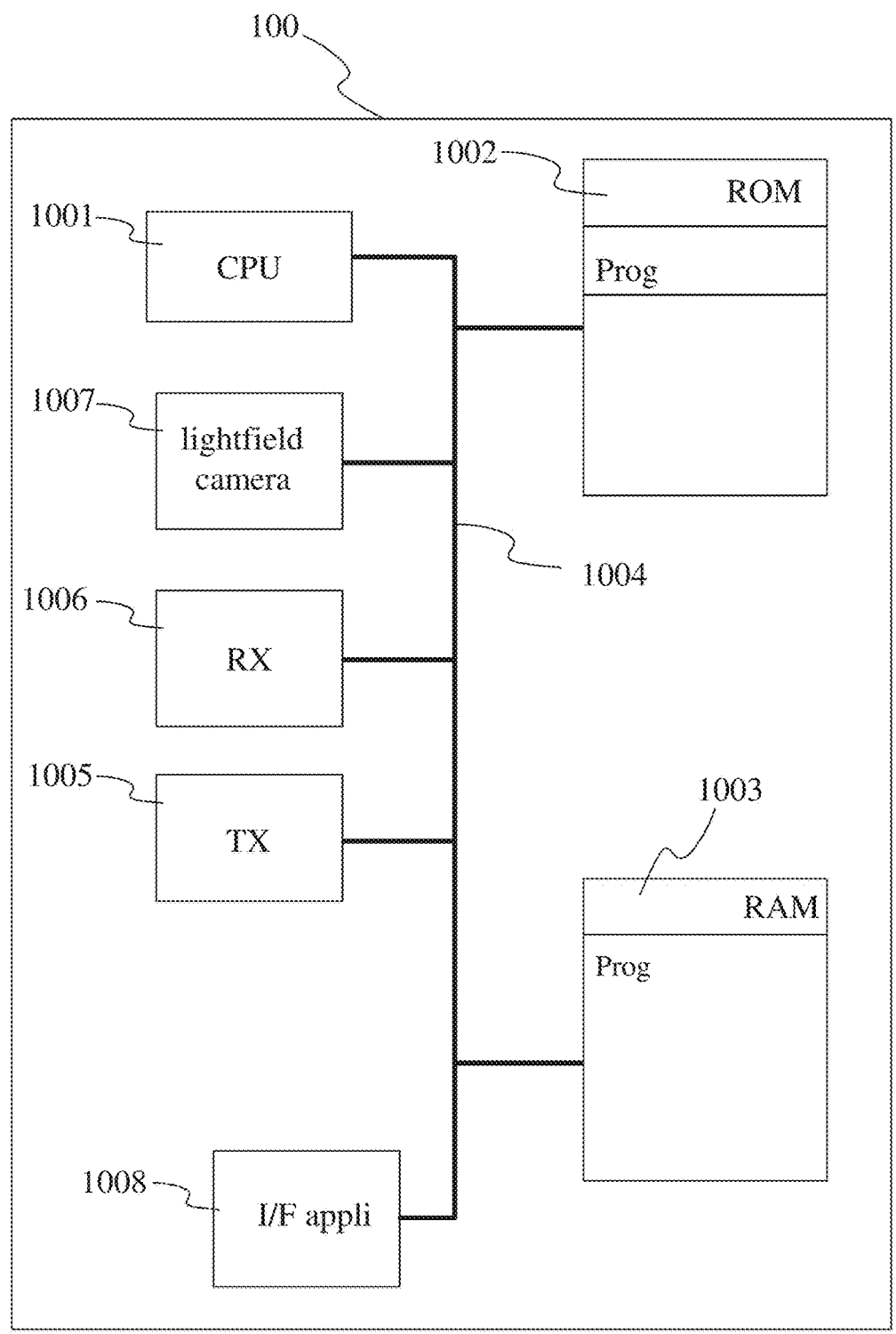
FIG. 10 is a block diagram illustration of an exemplary device depicting a telecommunication device used such as with processing flowchart depicted in FIG. 9, according to one embodiment of the present principles.

FIG. 10 diagrammatically illustrates a hardware embodiment of a telecommunication device 100, corresponding for example in one embodiment to a mobile device such as a smartphone, a tablet or other similar devices that embody a lightfield camera as per one embodiment.

In the embodiment provided by FIG. 10, a telecommunication device 100 is shown that comprises the following elements, connected to each other by a bus 1004 of addresses and data that also transports a clock signal:

- a microprocessor 1001 (or CPU),
- a non-volatile memory of ROM (Read Only Memory) type 1002,
- a Random Access Memory or RAM 1003,
- a radio interface 1006,
- an interface 1005 adapted for the transmission of data,
- a lightfield camera 1007, corresponding for example to the plenoptic camera 1 of FIG. 1 or to the multi-camera array 2 of FIG. 2,
- an MMI (Man Machine Interface) 1008 adapted for displaying information for a user and/or inputting data or parameters.

It is noted that the word "register" used in the description of memories 1002 and 1003 designates in each of the memories mentioned, a memory zone of low capacity as well as a memory zone of large capacity (enabling a whole programme to be stored or all or part of the data representing data received and decoded).

The memory ROM 1002 comprises in particular a "prog" program.

The algorithms implementing the steps of the method specific to the present disclosure and described below are stored in the ROM 1002 memory associated with the telecommunication device 100 implementing these steps. When powered up, the microprocessor 1001 loads and runs the instructions of these algorithms.

The random access memory 1003 notably comprises:
in a register, the operating programme of the microprocessor 1001 responsible for switching on the telecommunication device 100,
reception parameters (for example parameters for modulation, encoding, MIMO, recurrence of frames),
transmission parameters (for example parameters for modulation, encoding, MIMO, recurrence of frames),
incoming data corresponding to the data received and decoded by the receiver 1006,
decoded data formed to be transmitted at the interface to the application 1005,
parameters of the lightfield camera,
lightfield data forming the raw image and/or the views,
data representative of groups of rays and/or free rays,
information representative of depth, e.g. comprised in a depth map.

Other structures of the telecommunication device 100 than those described with respect to FIG. 10 are compatible with the present disclosure. In particular, according to variants, the telecommunication device may be implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components embedded in an apparatus or even in a form of a mix of hardware elements and software elements.

The radio interface 1006 and the interface 1005 are for example adapted for the reception and transmission of signals according to one or several telecommunication standards such as IEEE 802.11 (Wi-Fi), standards compliant with the IMT-2000 specifications (also called 3G), with 3GPP LTE (also called 4G), IEEE 802.15.1 (also called Bluetooth).

In an alternate embodiment, the telecommunication device does not include any ROM but only RAM, the algorithms implementing the steps of the method specific to the present disclosure and described with regard to FIG. 9 being stored in the RAM. According to another variant, the telecommunication device 100 comprises a SSD (Solid-State Drive) memory instead of the ROM and/or the RAM.

Naturally, the present disclosure is not limited to the embodiments previously described.

In particular, the present disclosure is not limited to an apparatus configured to process lightfield data or to a method of processing lightfield data but also extends to a method/apparatus for displaying the representation of the lightfield data and/or to reconstruct one or more views of the scene or part of the scene, for example background part of the scene by removing foreground objects and by using the information relative to the groups of rays and/or the depth information stored in the depth map or to any device comprising such an apparatus or implementing such method(s), for example a telecommunication device.

Telecommunication devices includes, for example, smartphones, smartwatches, tablets, computers, mobile phones, portable/personal digital assistants ("PDAs"), see-through glasses, Head-Mounted Display (HMD) and other devices that facilitate communication of information between end-users but also set-top-boxes.

The method of obtaining a depth map described herein may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of processing lightfield data representative of a scene, said lightfield data comprising a plurality of elements, 4-dimensional coordinates being associated with each element of said plurality of elements, the method comprising:

associating a ray with each element, said ray being obtained from the 4-dimensional coordinates associated with each said element;

determining a depth information for each said element;

determining an origin of each said ray in the scene according to said depth information;

grouping rays with a same origin in the scene to form a plurality of groups;

for at least one pair of groups of said plurality of groups, establishing a relationship between a first group of rays and a second group of rays forming said at least one pair, a weight being associated with said relationship and determined by:

for each ray of at least a part of the rays of said first group, calculating a difference between a ray of said second group and said ray of said first group, when said ray of said second group is comprised in a neighborhood of said ray of said first group;

determining said weight by summing said differences;

processing said lightfield data according to said plurality of groups and said relationship.

2. The method according to claim 1, wherein a first ray referenced 'i' and represented with 4-dimensional coordinates $(s_i, t_i, x_i, y_i)$ and a second ray referenced 'j' and represented with 4-dimensional coordinates $(s_j, t_j, x_j, y_j)$ are grouped in a same group of said plurality of groups when:

$$x_i + (s_i - s_j) \times D(s_i, t_i, x_i, y_i) - x_j < E1, \text{ and}$$

$$y_i + (t_i - t_j) \times D(s_i, t_i, x_i, y_i) - y_j < E2$$

wherein $D(s_i, t_i, x_i, y_i)$ corresponds to the depth information associated with said first ray, E1 corresponds to a first determined value and E2 corresponds to a second determined value.

3. The method according to claim 2, wherein said first ray and said second ray are grouped in said same group when following conditions are further met:

$$x_j + (s_j - s_i) \times D(s_j, t_j, x_j, y_j) - x_i < E1, \text{ and}$$

$$y_j + (t_j - t_i) \times D(s_j, t_j, x_j, y_j) - y_i < E2$$

wherein $D(s_j, t_j, x_j, y_j)$ corresponds to the depth information associated with said second ray.

4. The method according to claim 1, wherein at least one ray is not assigned to a group of said plurality of groups.

5. The method according to claim 1, wherein the processing comprising segmenting said lightfield data according to said relationship.

6. A non-transitory processor readable medium having stored therein instructions for causing a processor to perform the operations of the method according to claim 1.

7. A device adapted to process lightfield data representative of a scene, said lightfield data comprising a plurality of elements, 4-dimensional coordinates being associated with each element of said plurality of elements, wherein the device comprises at least one processor configured to:

associate a ray with each element, said ray being obtained from the 4-dimensional coordinates associated with said each element;

determine a depth information for said each element;

determine an origin of each said ray in the scene according to said depth information;

group rays with a same origin in the scene so as to form a plurality of groups;

for at least one pair of groups of said plurality of groups, establish a relationship between a first group of rays and a second group of rays forming said at least one pair, a weight being associated with said relationship and determined by:

for each ray of at least a part of the rays of said first group, calculating a difference between a ray of said second group and said ray of said first group, when said ray of said second group is comprised in a neighborhood of said ray of said first group;

determining said weight by summing said differences;

process said lightfield data according to said plurality of groups and said relationship.

8. The device according to claim 7, wherein said at least one processor is configured to group a first ray referenced 'i' and represented with 4-dimensional coordinates $(s_i, t_i, x_i, y_i)$ and a second ray referenced 'j' and represented with 4-dimensional coordinates $(s_j, t_j, x_j, y_j)$ in a same group of said plurality of groups when:

$$x_i + (s_i - s_j) \times D(s_i, t_i, x_i, y_i) - x_j < E1, \text{ and}$$

$$y_i + (t_i - t_j) \times D(s_i, t_i, x_i, y_i) - y_j < E2$$

wherein $D(s_i, t_i, x_i, y_i)$ corresponds to the depth information associated with said first ray, E1 corresponds to a first determined value and E2 corresponds to a second determined value.

9. The device according to claim 8, wherein said at least one processor is configured to group said first ray and said second ray in said same group when following conditions are further met:

$$x_j + (s_j - s_i) \times D(s_j, t_j, x_j, y_j) - x_i < E1, \text{ and}$$

$$y_j + (t_j - t_i) \times D(s_j, t_j, x_j, y_j) - y_i < E1$$

wherein $D(s_j, t_j, x_j, y_j)$ corresponds to the depth information associated with said second ray.

10. The device according to claim 7, wherein at least one ray is not assigned to a group of said plurality of groups.

11. The device according to claim 7, wherein the at least one processor is further configured to segment said lightfield data according to said relationship.

12. A multimedia terminal comprising a lightfield acquisition device and the device according to claim 7.

* * * * *